United States Patent [19]

Pan et al.

[11] Patent Number: 4,551,087
[45] Date of Patent: Nov. 5, 1985

[54] EXTRUSION APPARATUS

[75] Inventors: Ali Pan, Storrington Township; Karl S. Cohrs, Kingston, both of Canada

[73] Assignee: Northern Telecom Limited, Montreal, Canada

[21] Appl. No.: 619,043

[22] Filed: Jun. 11, 1984

[51] Int. Cl.⁴ .............................................. B29F 3/04
[52] U.S. Cl. ...................................... 425/466; 72/269
[58] Field of Search .................. 425/376 R, 461, 465, 425/466, 467, 468, 380, 381; 29/406, 464; 164/421, 465; 72/268, 269

[56] References Cited

U.S. PATENT DOCUMENTS

| | | | |
|---|---|---|---|
| 751,108 | 2/1904 | Royle | 425/466 |
| 1,371,576 | 3/1921 | Royle | 425/467 |
| 2,502,247 | 3/1950 | Clark et al. | 425/465 |
| 3,299,474 | 1/1967 | Ashworth | 425/467 |
| 4,120,633 | 10/1978 | Feuerherm | 425/467 |
| 4,212,620 | 7/1980 | McLaren | 425/466 |
| 4,368,026 | 1/1983 | Budel et al. | 425/381 |

Primary Examiner—Willard E. Hoag
Attorney, Agent, or Firm—R. J. Austin

[57] ABSTRACT

Extrusion apparatus with means to effect movement of a die insert. The die insert has an upstream extension with two planes of movement. For each plane of movement, two thrust means are provided, one at each side of the insert for movement in one direction in the plane. Each thrust means acts at an angle to the required direction of movement of the insert, and produces thrust which is inclined to the direction of movement of the thrust means. In one arrangement, two arms move together, one at each side of the insert extension and place thrust upon the extension. In another arrangement there is cam operation controlled by operating rings surrounding the extension. For movement in each plane, the extension is held in that plane by stationary thrust means which, during movement, controls extension movement in the other plane.

16 Claims, 9 Drawing Figures

EXTRUSION APPARATUS

This invention relates to extrusion apparatus.

In cases where an axial passage is to be provided within an extrusion, it is conventional practice to provide an insert within an extruder, the insert projecting from within the extruder and at least as far as the die orifice. The surrounding extrusion die and the insert define, between them, the shape and thickness of the article and the insert also forms the shape of the inner surface of the extrusion which defines the passage. In the manufacture of some extruded articles, the thickness from the inner to outer surface is important and any variation in thickness because of incorrect relative positioning of the insert and surrounding die, needs to be corrected. Such is the case in the manufacture of insulation jackets for telecommunications cables, the jackets being extruded onto cable cores comprising a plurality of pairs of twisted together conductors. In the manufacture of the telecommunications cables, the die insert is referred to as a "core tube".

To make corrections to the relative positions of die and core tube in cable manufacture, extrusion apparatus has been developed in which the extruder die is adustably mounted on an outside face of the extruder and manually movable adjustment means is provided to move the die laterally of the feedpath. Problems arise with this situation. It is difficult for an extruder operator to adjust the die manually during use of the apparatus, because the extruded cable core issuing from the die has to be avoided while performing the adjustment procedure close by. Also, the heat emanating from the apparatus and extruded article is uncomfortable. Further to this, any lateral adjustment of the die takes place against the extrusion forces in the extrudate emerging from the die orifice and as these forces are high, the adjustment is difficult to accomplish during use of the apparatus. An automatic operation on the other hand is also fraught with problems because the high extrusion temperatures, e.g. around 230° C., affect the operation of any driving motor and moving parts mounted in the die region.

The present invention provides an extrusion apparatus in which the above problems are overcome. The apparatus of the invention relies upon a die insert with a universal mounting and which extends upstream from the mounting away from the die orifice. Thrust means are provided to move the insert in two planes. In respect of each plane, the thrust means are in opposition and are movable together in one directional sense or another to apply thrust at an angle to the movement of the thrust means thereby causing die insert movement.

Accordingly, the present invention provides an extrusion apparatus comprising an extrusion head having a passage for material to be extruded, an extrusion die and a die insert which between them define a die orifice of endless form, the die insert extending upstream from the die orifice, mounted in the head in a universal mounting and having a portion extending from the head in the direction opposite to the die orifice, and means to effect movement of the die insert in two planes about its mounting and, in respect of movement in each plane, said means comprises two opposing thrust means spaced-apart one at each side of said insert portion, the thrust means movable together alternatively in one directional sense or another and operable, one by movement in each directional sense, to apply thrust to cause movement of the insert portion in one direction or the other in said plane, the thrust produced by each thrust means during its operational movement being at an angle to the movement in the directional sense while the insert portion maintains operable engagement with the other thrust means to enable said other thrust means to apply thrust immediately upon change in the directional sense of movement.

In a preferred arrangement, the insert portion has two pairs of parallel surfaces, one pair for each plane of movement. The two pairs of surfaces extend at an angle to each other with the surfaces of each pair disposed one at each side of the insert portion. In the preferred arrangement each surface is operably connected to the thrust means to apply thrust against that surface. Movement of the die insert in each plane is controlled by two opposing thrust means which engage the parallel surfaces of one pair. The other pair of parallel surfaces are permitted by their thrust means to move lengthways so as to act as guides for movement of the die insert. The means to effect the movement may comprise a pair of spaced-apart arms extending one to each side of the insert portion and the thrust means then comprises a cooperating means disposed between each arm and the insert portion. Alternatively, the two opposing thrust means are provided in circumferentially spaced positions around an arcuate member which extends around the insert portion, means being provided to rotate the arcuate member in one directional sense or the other to apply thrust to cause movement of the insert. More specifically, each thrust means comprises a cam having a surface which is inclined to the direction of movement of the arcuate member at the cam position. Conveniently, each arcuate member is a ring which surrounds the insert portion.

Embodiments of the invention will now be described, by way of example, with reference to the accompanying drawings in which.

Figure 1:
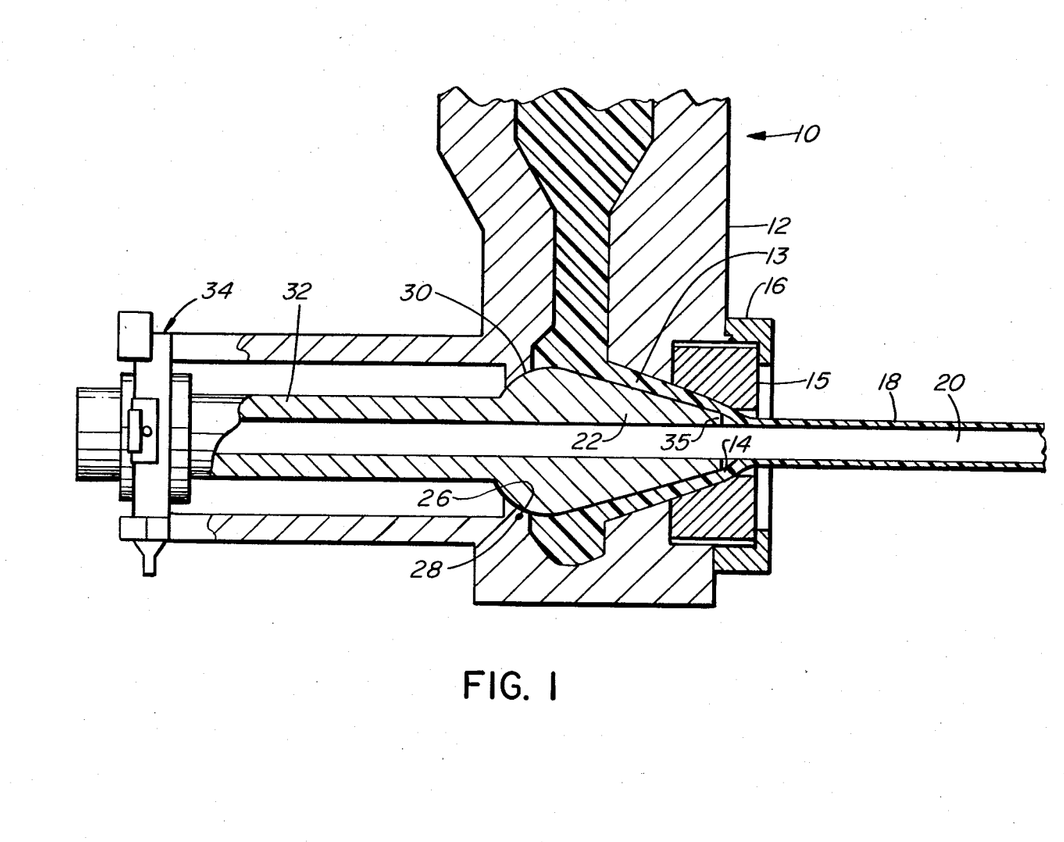
FIG. 1 is a cross-sectional view through an extrusion head of apparatus according to a first embodiment.

In a first embodiment as shown by FIG. 1, an extrusion apparatus comprising an extruder 10 has an extruder head 12 for flow of extrudate through annular passages 13 from the extruder and through an annular die orifice 14 between a die of a die and holder assembly 15 and a die insert or core tube 22. The assembly 15 is held in position in conventional manner by a die block 16. The orifice is for providing a layer of insulation 18 around the core 20 of a telecommunications cable. It is important that the thickness of the insulation 18 should be as uniform as possible around the core. For this purpose, the core tube 22 should be located centrally within the orifice 14. However, the location of the core tube in a fixed position concentrically within the die is not practical. Hence, it is necessary to allow for some adjustment to be made to obtain uniform thickness of the insulation circumferentially of the core 20. To enable the adjustment to take place, the core tube is movable within the die 24. As shown by FIG. 1, the core tube extends upstream from the die orifice in a tubular form and has a part spherical surface 26, which is mounted in a universal mounting 28 with a complementary surface 30. The mounting 28 is a rigid part of the head 12. The core tube 22 has an extension 32 upstream from its universal mounting.

Figure 2:
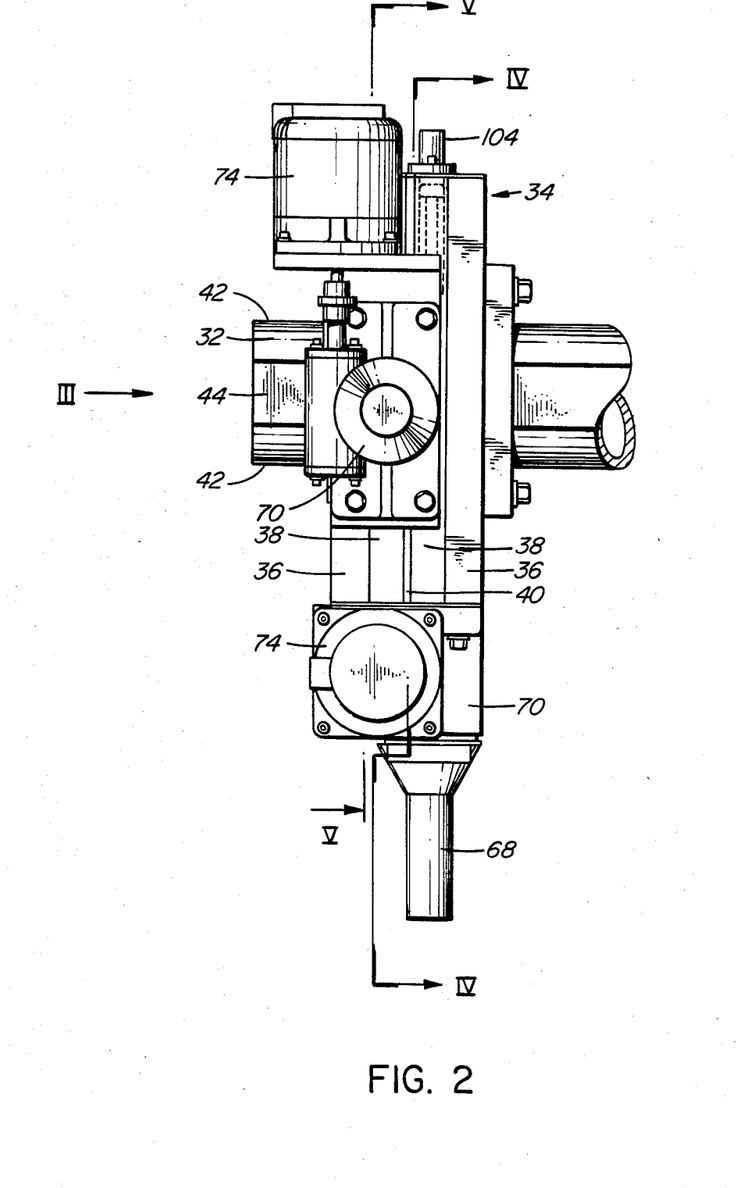
FIG. 2 is a side elevational view of part of the apparatus of FIG. 1 and on larger scale.
Figure 3:
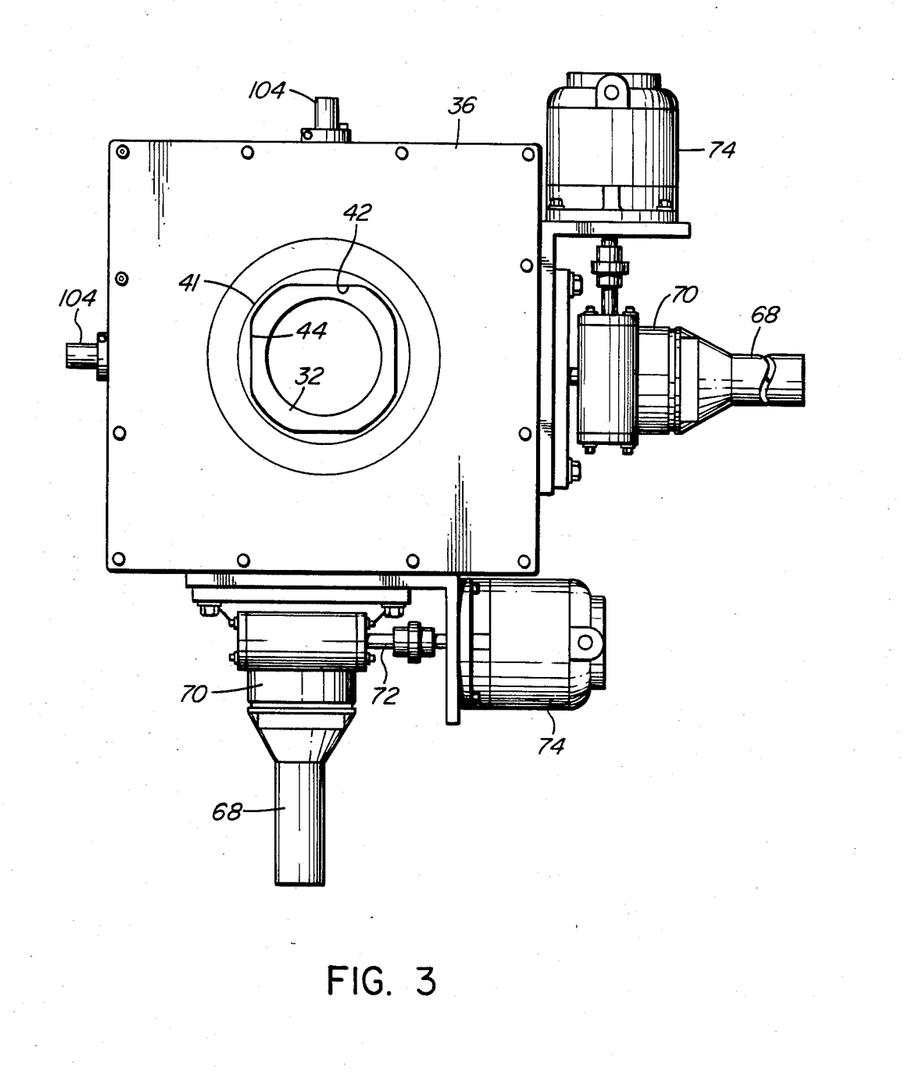
FIG. 3 is a view in the direction of arrow III in FIG. 2.

Associated with the core tube extension 32 is a means 34 to effect movement of the core tube in two planes within its mounting, whereby the end 35 of the core tube within the die orifice is caused to move laterally of the orifice and into a position concentric with the die. As shown in FIG. 2, the means 34 comprises a flat plate structure comprising two end plates 36 and intermediate plates 38 with a spacer 40 disposed between the two plates 38. As shown by FIG. 3, each end plate 36 is formed with a central hole 41 through which the core tube extension 32 projects. The extension 32 terminates upstream slightly beyond the means 34 as shown in FIGS. 1 and 2. The structure of plates is secured to the head 12, also as shown by FIG. 1.

Figure 4:
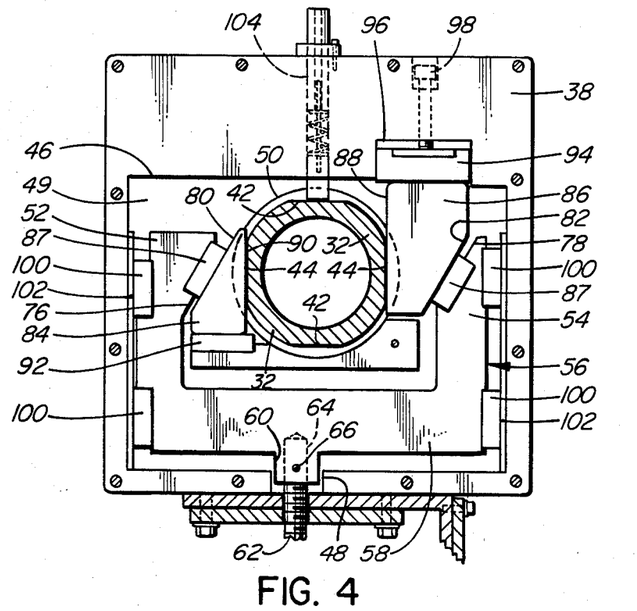
FIGS. 4 and 5 are cross-sectional views of the apparatus taken along lines 'IV—IV' and 'V—V' in FIG. 2.
Figure 5:
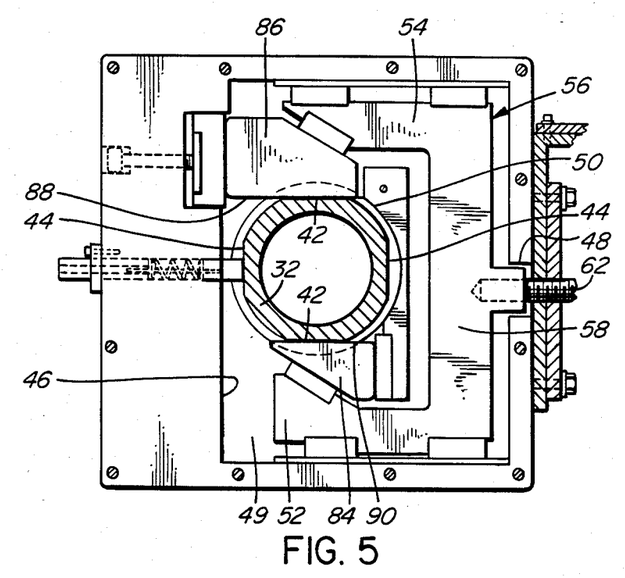

As shown particularly by FIG. 4, the core tube extension as it extends through the plates 36, 38 and 40, is provided with two pairs 42 and 44 of parallel surfaces. These pairs of surfaces are provided one for each plane of movement of the core tube in its universal mounting. The surfaces of each pair lie substantially normal to the surfaces of the other pair as shown by FIG. 4. As shown by FIGS. 4 and 5, which are direct views upon one surface of each of the plates 38, each plate is formed with a substantially rectangular opening 46, which is entirely surrounded by the plate except for a cut away section 48 at one side of the plate. The opening 46 of each plate 38 defines, together with a plate 36 and the plate 40, a substantially rectangular chamber 49, having the depth provided by the thickness of tne plate 38. As shown by FIGS. 4 and 5, the plate 40 has a central orifice 50 which enables the extension 32 to pass through the plate and connect the chambers together.

As shown by FIGS. 4 and 5, the two chambers 49 contain a mechanism forming part of the means to effect movement of the core tube in the two planes about its mounting. As the mechanism in these chambers is substantially identical, one with the other, then only the mechanism in one of the chambers need be described in detail.

As shown for instance by FIG. 4, the means to effect movement of the core tube in a horizontal plane includes a pair of spaced apart arms 52 and 54, which extend one to each side of the extension 32. Arms form part of a yoke 56 provided with a base 58, integrally formed with the arms. At the centre part of the base is a lateral extension 60 which projects through the opening 48 in the plate 38. Connected to this projection 60 is an end of a screwed shaft 62 with an end 64 received within a blind hole within the projection 60 to be secured for slight movement relative to the yoke by a shear pin 66. The shaft 62 forms part of a gearing mechanism for controllably moving the yoke in a vertical direction as shown in FIG. 4 to move the two arms 52 and 54 together, either upwards or downwards relative to the core tube extension. The shaft 62 extends outwardly through an extension 68 of a gear mechanism 70 (FIGS. 2 and 3). A worm drive (not shown) within the housing is drivably connected by a drive shaft 72 to a stepping electric motor 74 for drivable connection to the spindle 62 to move it vertically in one direction or the other, as required, without spindle rotation. The gear mechanism is appropriately that sold under the trademark "Jactuator" in the 2,800 series by Duff-Norton Company of Charlotte, N.C.

Thrust means are provided for converting the vertical movement of the arms 52 and 54 into the horizontal movement, which is required of the core tube to move it in the horizontal plane. This thrust means comprises cooperating means of two parts for each arm. One of these cooperating parts in respect of each arm is the outward end of the arm which is an inclined thrust region as at 76 or 78 and this angle of inclination is accompanied by an opposing inclined surface region 80 or 82 of an intermediate thrust member 84 or 86, which is disposed between the arm and vertical surface 44 of the extension 32. Linear bearings 87 are provided between the surfaces 76 and 80 and 78 and 82 to allow for vertical movement of the arms accompanied by a longitudinal relative displacement of the opposing surfaces as will be described. The intermediate thrust members 84 and 86 therefore provide the other cooperating parts to the ends of the arms and are formed with vertical surfaces 88 and 90, which engage continuously the surfaces 44 of the extension 32. It is required that the members 84 and 86 should only move in a horizontal direction and to this end, the members are trapped between the surfaces 44 and 76 or 78, as the case may be, on two sides and by a guide on a third side. As shown by FIG. 4, this guide, in respect of member 84 or 86, is a guide plate 92 or 94 held in position relative to the plate 38. With regard to the intermediate member 86, the guide 94 is slidably located within a recess 96 of the plate 38 for adjustment by a screw 98 to accommodate any slack within the mechanism during operation. This accommodation of slack ensures that the linear bearings held by the surfaces 76 and 78 continuously engage the surfaces 80 and 82 of the members 84 and 86, without any freedom of movement in any of the moving parts. To allow the arms and the yoke to move vertically the sides of the arms are provided with linear bearings 100, which engage bearing plates 102, attached to the plate 38 along sides of the opening 46. The plate 38 also houses a transducer 104 which extends through the plate and engages a surface 42 of the insert. This transducer is electrically connected to an instrument (not shown) for the purpose of indicating when the core tube is disposed in a central position to enable extrusion through the die orifice to be commenced.

As can be seen from FIG. 5, the structure of the mechanism within the other plate 38 is of the same construction as that described with regard to FIG. 4, except that the surfaces 88 and 90 of the intermediate members 84 and 86 engage the surfaces 42 of the other pair on the extension 32.

In use, the mechanism shown in FIG. 4, is intended to move the core tube horizontally, with the purpose of centralizing it relative to the die and the mechanism shown in FIG. 5 moves the die core tube vertically. So far as the mechanism shown in FIG. 4 is concerned, upon vertical movement of the spindle 62 in the upward direction, the arms 52 and 54 also move vertically and the arm 54 through its linear bearing, places a thrust upon the surface 82. This thrust can only be converted into a horizontal movement of the intermediate member 86 because of the abutment against the plate 94 and hence the member 86 pushes sideways against the core tube extension 32 to move it towards the left horizontally. During this movement, the intermediate member 84 is urged towards the left by the extension 32 and the arm 52, in roving vertically upwards, allows the member 84 to maintain its engagement against the linear bearing in the arm 52. Alternatively, with the arms 52 and 54 being moved downwards, the thrust direction is reversed with the arm 52 imposing a sideways force upon the intermediate member 84. As this member can only move horizontally towards the right under such a force, because of the plate 92, then this causes the extension 32 to be moved horizontally towards the right and the member 86 is moved in front of the extension while being maintained in contact with the linear bearing in the arm 54. Thus, no slack is provided during the movement of the parts as shown in FIG. 4.

The same type of movement also takes place in the mechanism shown in FIG. 5. It is important to realize, however, that with only one of the mechanisms operating at any one time, then the other mechanism acts as a guide for movement of the core tube during this period. For instance, with the mechanism of FIG. 5 stationary, the two intermediate members 84 and 86 have their surfaces 88 and 90 in engagement with the parallel surfaces 42 of the die insert and hold these in fixed vertical positions. Hence, as the movement of the mechanism and the core tube in FIG. 4 is horizontal, then this horizontal movement does not allow for the core tube to wander vertically because of the restraining effect upon the surfaces 42 by the members 84 and 86 in FIG. 5. Thus, the surfaces are permitted to move lengthways by the members 84 and 86. On the other hand, with the mechanism of FIG. 5 operating, then the members 84 and 86 in the stationary position in FIG. 4 hold the core tube against any horizontal displacement so that it will move solely in a vertical direction.

It is important to realize that the use of the intermediate thrust members 84 and 86 enables the design of the total arrangement to be simplified. With the angles between the surfaces 80 and 90 and 82 and 88 chosen correctly for the intermediate members, then the arms will move in a direction normal to the plane in which the core tube should move upon movement of the arms. Thus, for a vertical movement of arms 52 and 54 in FIG. 4, the core tube will move horizontally. Because of this, the design of the parts may be based upon right angle structures or openings as shown. The apparatus described in the first embodiment is of simple design, while enabling the core tube to be moved accurately for positioning its downstream end 34 within the die to maintain the uniformity of the extruded thickness material around the core 20. It should be noted that there is a mechanical advantage in the operation of the apparatus. As will be appreciated, with the vertical movement of the arms 52 and 54, the linear bearings on the arms move along the surfaces 82 and 80 and provide a sideways thrust for core tube movement. This thrust is more easily accommodated and with less power than would be required by applying a force directly sideways from the gear assembly 70 onto the core tube. It should also be borne in mind that because a large distance may be provided between the universal mounting 26, 30 and the means 34, that a large turning movement may be provided for pivoting the core tube. Such a turning movement easily overcomes any resistance to displacement of extrudate issuing from the die passage 13 and through the orifice 14 to enable the core tube to move laterally to recentralize it. This type of movement is more easily accomplished than any movement, such as in conventional extruder heads, in which the surrounding die is movable laterally instead of the core tube 22. A further advantage is, of course, the fact that the operating mechanism is displaced upstream away from the passages for the extrudate, so that heat dissipation ensures that little or no heat reaches the mechanism to cause damage.

Figure 6:
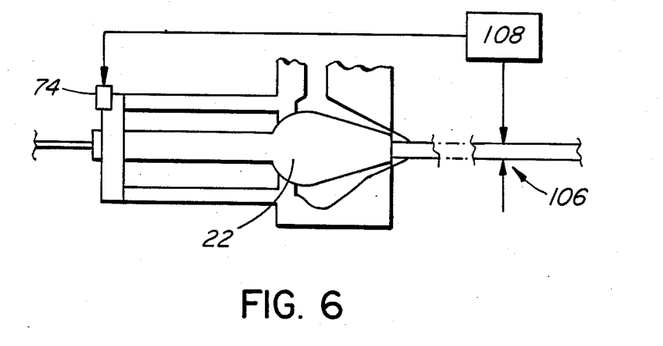
FIG. 6 is a side elevational view showing diagrammatically, a control for positioning a die insert in the apparatus.

Control of the mechanism may be easily accommodated as shown in FIG. 6. As shown by that Figure, downstream from the extruder head is disposed a conventional means 106 for measuring the thickness of the insulation 18 at spaced positions around the circumference, for instance, at 90° intervals. Upon measurements being made by the device 106, electrical signals are sent to a control in the form of a microprocessor 108. These signals are compared with one another and with a datum signal corresponding to the desired thickness of the insulation. Upon signal comparison, if it is clear that parts of the insulation 18 are thicker than other parts, then the core tube needs to be centralized within the die. Hence, a signal is generated by the microprocessor and is sent to the appropriate motor 74 for operating the mechanism between the plates, to move the core tube either horizontally or vertically or both, until it has retained its centralized position within the die to ensure uniform thickness of insulation around the core.

Figure 7:
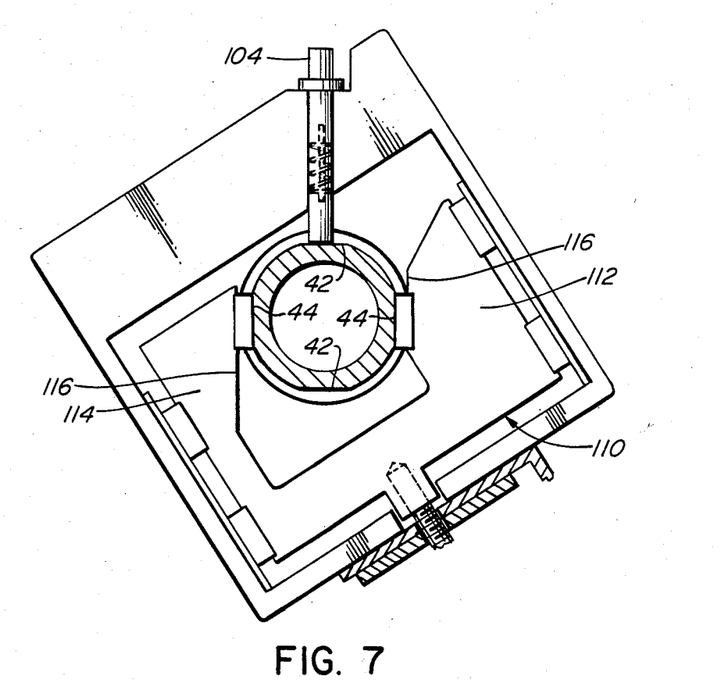
FIG. 7 is a view similar to FIG. 4 of a second embodiment.

In a second embodiment, as shown in FIG. 7 which represents a part of the mechanism corresponding to either FIG. 4 or FIG. 5, the mechanism is devoid of intermediate members 84 and 86. As shown by the second embodiment, the mechanism has a yoke 110 with arms 112, 114, which have ends inclined to form cooperating means which cooperate, one with each of parallel surfaces 42 or 44 upon the core tube itself. Because of the lack of the intermediate members 84 and 86, then the angle of thrust upon the surfaces 42 or 44 by the arms entails a positioning of the arms which is other than normal to the direction of movement of the core tube. For instance, for the horizontal movement of the core tube which will take place with the FIG. 7 part of the mechanism, then the arms and the yoke are inclined at an angle, which corresponds to the angle of inclination of the surfaces 116 of the arms, for effecting the sideways component of thrust. As will be appreciated, the structure shown in FIG. 7 calls for a more accurate and precise design of the parts, because no provision can be made for elimination of slack by adjustment, such as is included in the first embodiment.

Figure 8:
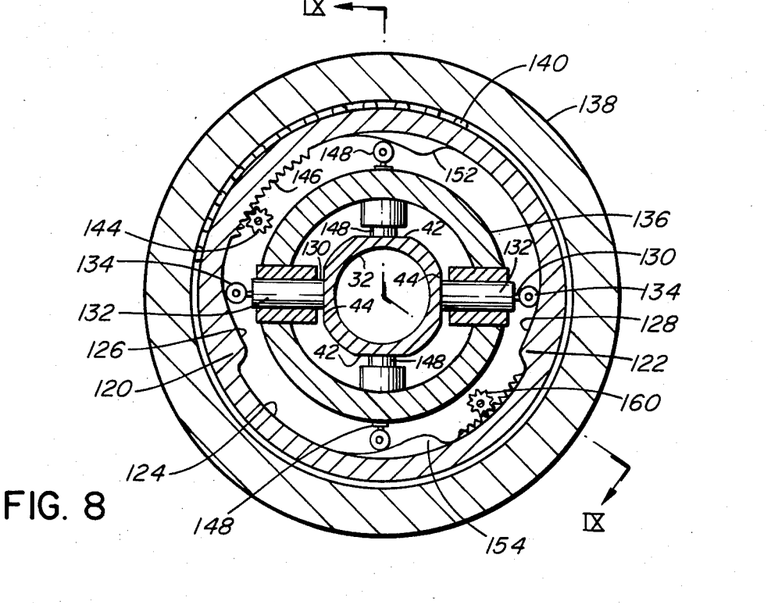
FIG. 8 is a view similar to FIG. 4 of a third embodiment.
Figure 9:
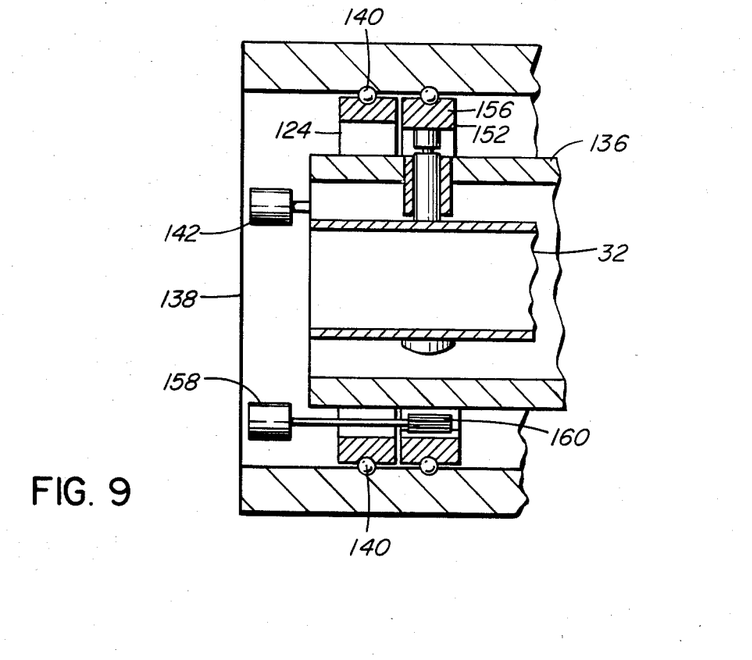
FIG. 9 is a cross-sectional view taken along line 'IX—IX' of the third embodiment.

A third embodiment is shown in FIGS. 8 and 9. In this embodiment, a die insert and its extension 32 are of similar construction to the first embodiment and bear the same reference numerals.

In the third embodiment, the means for effecting movement of the core tube in one plane is similar to that in the other. For movement in the horizontal plane, two opposing thrust means are provided in circumferentially spaced positions around an arcuate member. These thrust means comprise two cams 120, 122 formed inwardly of a ring 124. As may be seen, cam surfaces 126 and 128 of the cams face in opposite circumferential directions of the ring. The cams are provided to cooperate with the surfaces 44 of the core insert extension 32, one cam to each surface. Between each cam and its surface 44 is disposed a radially extending cam follower 130 which comprises a cylindrical plunger 132 and follower roller 134, rotatable at the outer end of the plunger. The geometry of the structure is such that to avoid slack, each plunger 132 always maintains contact with its surface 44 and the roller 134 is always engaged with cam surface 126 or 128. Each cam follower is radially movable of the core tube extension 32 by sliding reception of the plunger 132 within a bore in a fixed member in the form of a cylinder 136 enshrouding the extension 32.

To cause operation of the thrust means, the ring 124 is rotatable within an outer fixed cylinder 138 by means of bearings 140. The ring is controllably rotated by an electrical motor 142, drivably connected to a driving gear wheel 144, in mesh with gear teeth 146 formed on the inner surface of the ring 124.

For movement of the core tube in the vertical plane, two cam followers 148 engage the surfaces 42 with the follower rollers engaging cams 152 and 154 which are formed upon ring 156 also mounted within cylinder 138. The ring 156 is rotatably controlled by electrical motor 158 and gear wheel 160. The two rings 124 and 156 are relatively positioned axially of the extension 32 as shown by FIG. 9.

In use and for movement in the horizontal direction, the core tube is prevented from vertical movement by the cam followers 148 engaging the surfaces 42 and held in position by the cams 152 and 154 of the stationary ring 156.

Rotation of the ring 124 by its motor 142 in a clockwise direction causes cam 120 to move its follower 130 towards the right in FIG. 8, thereby urging the extension 32 in that direction. The corresponding movement of cam 122 allows its follower 130 to move to the right also under the push of the extension 32 while this follower maintains its engagement with the surface 44 and with the cam 122. Rotational movement of the ring 124 in the anticlockwise direction causes the extension 32 to move towards the left in FIG. 8 under the influence of cam 122.

The vertical movement of the core tube is controlled by rotation of the ring 156 in a manner similar to that just described with reference to ring 124, with the cams 152 and 154 acting upon the followers 148. During vertical movement, the stationary ring 124 prevents horizontal movement of the core tube by holding the followers 130 in horizontally fixed positions.

What is claimed is:

1. Extrusion apparatus comprising an extrusion head having a passage for material to be extruded, an extrusion die and a die insert which between them define a die orifice of endless form, the die insert extending upstream along a die passage from the die orifice, mounted in the head in a universal mounting and having a portion extending from the head in the direction opposite to the die orifice, and means to effect arcs of movement of the die insert about its mounting along two different and crossing paths and, in respect of movement along each path;

said means comprises two opposing thrust means spaced-apart one at each side of said insert portion, the thrust means operable interconnected to be movable together alternatively in one directional sense or in the opposite directional sense and operable, one by movement in each directional sense, to apply thrust to cause movement of the insert portion in one direction or the other along said path, the thrust produced by each thrust means during its operational movement being at an angle to the movement in the directional sense while the operable interconnection between the thrust means ensures that the insert portion maintains continuous operable engagement with both thrust means during movement in either directional sense to enable a thrust means to apply thrust immediately upon change in the directional sense of movement; and during movement of the die insert in either direction along one path, the two opposing thrust means associated with movement along the other path are operably connected to the die insert to act as guides to hold it on said one path.

2. Apparatus according to claim 1 wherein, in respect of movement of the die insert along each path, the two opposing thrust means comprise cams having cam surfaces which are provided in circumferentially spaced positions upon a ring surrounding the insert portion, the two rings for the two paths being relatively positioned axially of the insert portion;

the insert portion has two pairs of parallel surfaces, one pair associated with the cams on each ring, one surface to each cam with one pair of parallel surfaces lying at an angle to the other pair;

a cam follower extends between each cam surface and its associated surface on the insert portion, the follower slidably received within a fixed member disposed between the cam surface and the insert portion; and during rotation of one of the rings to move the insert portion along one of the paths, the other ring holds its cam followers in fixed position and enables the pair of parallel surfaces associated with said other ring to move between the cam followers which act as guides for movement of the die insert along said one path.

3. Apparatus according to claim 1 wherein for movement of the die insert along each path, the two opposing thrust means are provided in circumferentially spaced positions around an arcuate member which extends around the insert portion, the arcuate member having means to rotate it alternatively in one directional sense or the other to apply thrust to cause movement of the insert.

4. Apparatus according to claim 3 wherein each thrust means comprises a cam having a surface which is inclined to the direction movement of the arcuate member at the position of the cam.

5. Apparatus according to claim 4 wherein each arcuate member is formed with gear teeth and the means to rotate the arcuate member comprises a driving gear wheel in mesh with the gear teeth of the arcuate member and means to drive the gear wheel.

6. Apparatus according to claim 4 wherein each cam is operably connected to the insert portion by a cam follower.

7. Apparatus according to claim 6, wherein the insert portion has two pairs of parallel surfaces, one pair of each path of movement and the surfaces of each pair are one at each side of the insert portion and extend at an angle to those of the other pair and a cam follower extends between each cam surface and one of the parallel surfaces of the insert portion, the follower being slidably received within a fixed member disposed between the cam surface and the insert portion.

8. Apparatus according to claim 1 wherein the insert portion has two pairs of parallel surfaces, one pair for each path of movement and the surfaces of each pair are one at each side of the insert portion and extend at an angle to those of the other pair, each surface is operably connected to the thrust means to apply thrust against that surface, and movement of the die insert along each path is controlled by two opposing thrust means engaging surfaces of one parallel pair with the other pair of parallel surfaces permitted by their thrust means to move lengthways so as to act as guides for movement of the die insert.

9. Apparatus according to claim 1 wherein, in respect of movement of the die insert along each path, the means to effect movement comprises a pair of spaced-apart arms extending one to each side of said insert portion and arm moving means to move the arms of the pair together and alternately in one of two opposite directions relative to the insert portion, the thrust means comprising cooperating means operably disposed between each arm and the insert portion, one of said parts having a thrust region which is inclined both to the direction of arm movement and to the direction of insert movement in said plane to provide a component of thrust upon the insert to pivot it and change its position relative to the extrusion die.

10. Apparatus according to claim 9 wherein, in respect of each path of movement, the insert portion has a pair of parallel surfaces and the pair of spaced arms cooperate, one with each of the parallel surfaces and with each arm having cooperating means in the form of an inclined thrust region which cooperates with its associated one of the parallel surfaces to provide insert movement.

11. Apparatus according to claim 9, wherein the insert portion has two pairs of parallel surfaces, one pair for each path of movement, and the surfaces of each pair are one at each side of the insert portion and extending at an angle to those of the other pair, and with respect to the surfaces of each pair, an intermediate thrust member is operably disposed between each surface and one of the associated pair of spaced arms, the intermediate member drivably engaging the associated surface of the insert portion and also forming part of said cooperating means with its associated arm having a region forming another part of the cooperating means.

12. Apparatus according to claim 11, wherein linear bearings are provided for rolling engagement along opposing surfaces of each thrust member and its arm.

13. Apparatus according to claim 11, wherein for each path of movement of the die insert, the associated pair of spaced apart arms move in their opposite directions substantially normal to the path of movement of the die insert.

14. Apparatus according to claim 11, wherein for movement of the die insert along one path by movement of the associated spaced-apart arms and associated thrust members upon one pair of the parallel surfaces, the other spaced-apart arms locate the other associated thrust members to act as guides by allowing said other parallel surfaces of the insert to move between the thrust members.

15. Apparatus according to claim 11, wherein each pair of spaced-apart arms forms part of a yoke having a base connecting the arms, and the arm moving means is operably connected to the base.

16. Apparatus according to claim 15 wherein the two yokes are slidably mounted in a support and the arm moving means controls the position of each yoke in the support.

* * * * *